United States Patent
Hwang et al.

(10) Patent No.: US 6,449,262 B1
(45) Date of Patent: Sep. 10, 2002

(54) METHOD AND APPARATUS FOR FREQUENCY SHIFTING WITH A CLOCK SIGNAL

(75) Inventors: Chien-Meen Hwang; Muoi V. Huynh, both of San Jose; Maged F. Barsoum, Sunnyvale; Hungming Chang, Cupertino; Eugen Gershon, San Jose, all of CA (US)

(73) Assignee: Legerity, Austin, TX (US)

( * ) Notice: Subject to any disclaimer, the term of this patent is extended or adjusted under 35 U.S.C. 154(b) by 0 days.

(21) Appl. No.: 09/286,993

(22) Filed: Apr. 7, 1999

(51) Int. Cl.$^7$ .................................................. H04J 4/00
(52) U.S. Cl. ...................... 370/307; 370/430; 370/478; 370/481; 375/222
(58) Field of Search ................................ 375/303, 260, 375/295, 298, 340, 222, 233, 283, 130, 261, 265, 291, 285; 370/203, 204, 206, 207, 210, 493, 495, 307; 307/208, 209, 430, 477, 478, 480, 481, 503, 516, 518

(56) References Cited

U.S. PATENT DOCUMENTS

| | | | | |
|---|---|---|---|---|
| 5,537,435 A | * | 7/1996 | Carney et al. | 375/233 |
| 5,541,955 A | * | 7/1996 | Jacobsmeyer | 375/222 |
| 5,666,378 A | * | 9/1997 | Marchetto et al. | 375/222 |
| 6,192,068 B1 | * | 2/2001 | Fattouche et al. | 375/130 |

\* cited by examiner

Primary Examiner—Salvatore Cangialosi
(74) Attorney, Agent, or Firm—McDermott, Will & Emery

(57) ABSTRACT

A physical layer device (PHY) device in a home LAN employs discrete multitone technology (DMT). The DMT system enables usage of existing residential wiring, which typically is telephone system grade twisted copper pair. The PHY device comprises an analog front end (AFE) circuit that frequency shifts the spectral images by using a clock signal. The multiplication of the clock signal is accomplished using a digital mixer or, in the alternative, an analog switch.

17 Claims, 5 Drawing Sheets

METHOD AND APPARATUS FOR FREQUENCY SHIFTING WITH A CLOCK SIGNAL

BACKGROUND OF THE INVENTION

1. Field of the Invention

The present invention relates to a discrete multi-tone (DMT) data communications network, more particularly to a DMT transceiver device.

2. Description of the Related Art

Modern society continues to create exponentially increasing demands for digital information and the communication of such information between data devices. Local area networks use a network, cable or other media to link stations on the network for exchange of information in the form of packets of digital data. A typical local area network architecture uses a media access control (MAC) enabling network interface cards at each station to share access to the media. Most conventional local area network architectures use media access controllers operating according to half-duplex or full-duplex Ethernet (ANSI/IEEE standard 802.3) protocol and a prescribed network medium, such as twisted pair cable.

These architectures have proven quite successful in providing data communications in commercial applications. However, these common local area network architectures require installation of specialized wiring and use of specific wiring topologies. For example, the most popular network protocols, such as Ethernet, require special rules for the wiring, for example with regard to quality of wire, range of transmission and termination.

Due to the success of the Internet and the rapid decreases in the prices of personal computers and associated data equipment, a demand has arisen for data communications between a limited number of devices within relatively small premises, typically a residence or small business. While existing local area networks can serve the purpose, in such installations, the cost of installing physical network wiring satisfying the rules for the particular protocol can be prohibitively expensive.

Most existing buildings, including residences, include some existing wiring, for phones, electrical power and the like. Proposals have been made to communicate data using such existing infrastructure. This reduces the costs of wiring for the network, but the existing wiring raises a variety of issues regarding transport of high-speed digital signals.

For example, efforts are underway to develop an architecture that enables computers to be linked together using conventional twisted pair telephone lines. Such an arrangement, referred to herein as a home network environment, provides the advantage that existing telephone wiring in a home may be used to implement a home network environment without incurring costs for substantial new wiring installation. However, any such network must deal with issues relating to the specific nature of in-home telephone wiring, such as operation over a media shared with other services without interference from or interfering with the other services, irregular topology, and noise. With respect to the noise issue, every device on the telephone line may be a thermal noise source, and the wiring may act much like an antenna to pick up disruptive radio signal noise. Telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard telephones coupled to the lines, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

At the same time a number of XDSL technologies are being developed and are in early stages of deployment, for providing substantially higher rates of data communication over twisted pair telephone wiring of the telephone network. XDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

Consider ADSL as a representative example. For an ADSL-based related service, the user's telephone network carrier installs one ADSL modem unit at the network end of the user's existing twisted-pair copper telephone wiring. Typically, this modem is installed in the serving central office or in the remote terminal of a digital loop carrier system. The user obtains a compatible ADSL modem and connects that modem to the customer premises end of the telephone wiring. The user's computer connects to the modem. The central office modem is sometimes referred to as an ADSL Terminal Unit—Central Office or 'ATU-C'. The customer premises modem is sometimes referred to as an ADSL Terminal Unit—Remote or 'ATU-R'. The ADSL user's normal telephone equipment also connects to the line through a frequency combiner/splitter, which is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Two techniques are under development for dividing the usable bandwidth of the telephone line to provide these channels. One approach uses Echo Cancellation. Currently, the most common approach is to divide the usable bandwidth of a twisted wire pair telephone line by frequency, that is to say by Frequency Division Multiplexing (FDM).

FDM uses one frequency band for upstream data and another frequency band for downstream data. The downstream path is then divided by time division multiplexing into one or more high-speed channels and one or more low speed channels. The upstream path also may be time-division multiplexed into corresponding low speed channels.

The FDM data transport for ADSL services utilizes discrete multi-tone (DMT) technology. A DMT signal is basically the sum of N independently QAM modulated signals, each carried over a distinct carrier frequency channel. The frequency separation between consecutive carriers is 4.3125 kHz with a total number of 256 carriers or tones (ANSI). An asymmetrical implementation of this 256 tone-carrier DMT coding scheme might use tones 32–255 to provide a downstream channel of approximately 1 MHz analog bandwidth. In such an implementation, tones 8–31 are used as carriers to provide an upstream channel of approximately 100 kHz analog bandwidth. Each tone is quadrature amplitude modulated (QAM) to carry up to 15 bits of data on each cycle of the tone waveform (symbol).

A conventional DMT system is shown in FIG. 6. The transmitter 601 includes a constellation point mapper 603 for logically mapping input bit streams onto a complex plane, whereby each sequence of bits (e.g., 2 bits) is equated to a complex number (i.e., constellation point). A constellation point represents the amplitude and phase of a particular tone. A typical ADSL system, for instance, employs 256 tones. An inverse Fast Fourier transform (IFFT) 605 then converts the constellation points, which provide information in the frequency-domain, to time-domain waveforms for transmission over the channel 625. Each conversion transforms 256 constellation points (complex numbers) into 512 samples of the time domain waveform. A parallel-to-serial block 607 clocks the samples out in a serial sequence for input to the analog front end (AFE) block 609, which is described below in the discussion of FIG. 7. The AFE block 609 outputs the actual bandpass waveform that is transmitted across the channel 625.

On the receiver side, the bandpass signal enters the receive AFE block 613. The AFE block 613 outputs a serial sequence of the digitized received waveforms to the input of the serial/parallel block 613, which converts the serial stream into a parallel set of data. The parallel data is then input into a Fast Fourier transform (FFT) 617 to extract the corresponding frequency-domain signals. The resulting frequency-domain data may display spectral power loss mainly because of the channel attenuation and digital to analog (D/A) conversion. Accordingly, the received signals usually undergo equalization to restore their spectral energy distributions. Slicer 621 then performs decoding of the complex numbers to corresponding bit streams.

FIG. 7 illustrates a traditional transmitter side AFE block 609 employed in the DMT system of FIG. 6. This transmitter side AFE block 609 comprises essentially four basic components: a D/A converter 701, low pass filter (LPF) 703, mixer 705, and a voltage controlled oscillator 707. The digital waveforms from the IFFT 605 are converted to an analog waveform (i.e., baseband signal). The baseband signal is fed into the LPF 703 to eliminate unwanted high frequencies; a typical cutoff frequency of the LPF 703 is 138 kHz. The filtered baseband signal is then up converted by mixer 705; the voltage controlled oscillator (VCO) 707 supplies a sinusoidal signal with an amplitude of A and frequency of co to the mixer 705. The mixer 705 and the VCO 707 operator as a modulator. Use of a VCO to directly frequency shift the modulating signal poses implementation constraints in terms of flexibility of integrated circuit (IC) design.

The AFE block 613 for the receiver side performs the above operations in essentially the reverse sequence. That is, the AFE block 613 receives the bandpass signal from the channel 625 and down converts it to restore the baseband signal. The baseband signal is then input to a LPF and then digitized with an analog to digital (A/D) converter (not shown).

The existing DSL systems provide effective high-speed data communications over twisted pair wiring between customer premises and corresponding network-side units, for example located at a central office of the telephone network. The DSL modem units overcome many of the problems involved in data communication over twisted pair wiring. However, for a number of reasons, the existing DSL units are not suitable to providing local area network type communications within a customer's premises. For example, existing ADSL units are designed for point-to-point communication. That is to say, one ATU-R at the residence communicates with one ATU-C unit on the network end of the customer's line, and the units are not useable for multi-point communications. Also, existing ADSL modems tend to be quite complex, and therefore are too expensive for in-home communications between multiple data devices of one customer. A need therefore still exists for techniques to adapt DMT type DSL communications for use in an in-home multi-point environment.

SUMMARY OF THE INVENTION

There exists a need for a DMT system that is tailored for use over existing in-home wiring. In particular, the DMT system needs to provide a technique for frequency shifting that is flexible in terms of design choice and can be readily implemented without complex logic or circuitry.

These and other needs are satisfied by the present invention, where a communication system includes a transmitter circuit that outputs a symbol represented by differentially encoded signals over a range of frequencies (or tones). The transmitter utilizes the system clock to frequency shift the differentially encoded signals for transmission across the channel.

According to one aspect of the present invention, a communication system for transmitting a bit stream comprises a transmitter circuit that generates a symbol. The symbol includes differentially encoded signals, in which each of the differentially encoded signals is mapped to one of a plurality of carrier frequencies based upon the bit stream. A receiver circuit receives the symbol and decodes the differentially encoded signals portion of the symbol to output the bit stream. Each of the received differentially encoded signals has a plurality of spectral images associated with the corresponding carrier frequency and its harmonics. A system clock is coupled to the transmitter circuit for frequency shifting the differentially encoded signals based upon the clock rate of the system clock. This arrangement advantageously permits an efficient technique of up converting the baseband symbol.

Another aspect of the present invention provides a method for transmitting a bit stream. The method comprises generating a symbol comprising differentially encoded signals based upon the bit stream via a plurality of carrier frequencies. The method also includes receiving the symbol and decoding the differentially encoded signals of the symbol to output the bit stream. Each of the received encoded signals has a plurality of spectral images associated with the corresponding carrier frequency and its harmonics. Further, the method includes frequency shifting the differentially encoded signals based upon a clock signal. The above method provides a cost-effective implementation of modulating the symbol.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF ILLUSTRATIVE EMBODIMENTS

The present invention contemplates providing frequency shifting of encoded signals in a DMT system, such as a DMT transceiver that utilizes differential encoding. It will become apparent, however, that the present invention is also applicable to other types of communication systems and devices.

Figure 1:
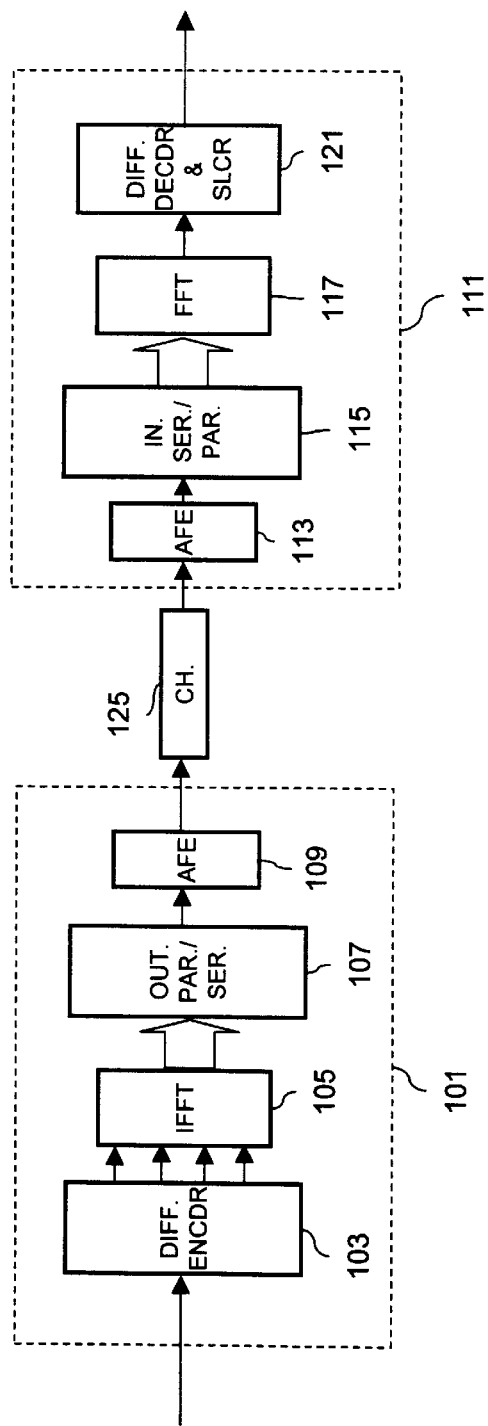
FIG. 1 is a block diagram of a DMT system according to an embodiment of the present invention.

FIG. 1 is a block diagram of a DMT system in which the present invention may be advantageously employed. A transmitter circuit 101 communicates with a receiver circuit 111 over a physical channel 125, which in an exemplary embodiment is a twisted pair infrastructure. In the implementation of a DMT transceiver (not shown), the transmitter circuit and the receiver circuit both reside on a single printed circuit board. Consequently, two DMT transceivers would be required to communicate across the channel 125. For purposes of explanation, FIG. 1 simply shows a transmitter circuit 101 sending data signals to a receiver circuit 111.

The transmitter 101 receives a digital bit stream from a digital source, for example, a host central processing unit (CPU) (not shown). The bit stream enters the differential encoder 103, which maps bit sequences of the bit stream to points on the complex plane (i.e., constellation points), in similar fashion to the operating principles of QPSK (quaternary phase shift keying). However, unlike QPSK, the differential encoder 103 encodes the difference between a current constellation point with a reference constellation point. The phase difference between constellation points represents two bits. The reference point is transmitted in a reference symbol prior to sending the symbols that contain actual data bits. In an exemplary embodiment, the differential encoder 103 encodes a bit stream in bit sequences of 2-bits using 256 frequencies (or tones); as a result, a symbol represents 512 bits. Because the encoding scheme focuses on amplitude and phase differences, absolute signal values are not needed for correctly detecting and decoding the received symbols. As such, this technique eliminates the need for a frequency domain equalizer (FEQ) to compensate for amplitude and phase distortion caused by the channel 125. The concept of differential encoding is more fully described below in the discussion of FIG. 3.

The output of the differential encoder 103 is a parallel array of "complex numbers." These complex numbers are input in a parallel manner to an Inverse Fast Fourier Transform (IFFT) logic 105. The IFFT logic 105 converts the complex numbers into time-domain waveforms, which are then supplied to an output parallel-to-serial logic 107. The output parallel-to-serial logic 107 basically arranges the time-domain waveform into a serial stream of samples. A guard band or cyclic-prefix can be prepended to this serial stream before entering the analog front end (AFE) circuit 109 to minimize intersymbol interference (ISI). ISI is an overlapping of waveforms that distorts all symbols involved, potentially resulting in data loss. The AFE circuit 109 is discussed in more detail with respect to FIG. 2. Among other functions, the AFE circuit 109 performs digital to analog (D/A) conversion and sends the symbol, which includes the differentially encoded signals, over channel 125 to receiver 111.

As seen in FIG. 1, after processing of the received signal by the AFE 113, the digitized samples of the waveforms are input to an input serial-to-parallel logic 117 for conversion to a parallel array of time domain data. A Fast Fourier Transform logic 119 converts the data array back to complex numbers, which are then mapped by the differential decoder and slicer 121 to corresponding bit sequences to recreate the original bit stream. Errors in the bit stream or loss of bits can be minimized through the use of two different frequency diversity techniques.

It should be apparent to one of ordinary skill in the art that the invention applies to different types of information carried by the analog signals transmitted. These include time marks, reference symbols, and user data symbols themselves.

Figure 2:
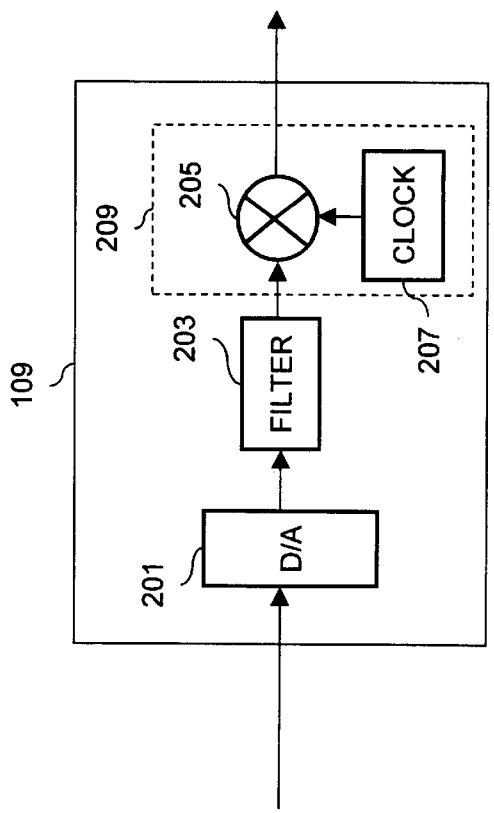
FIG. 2 is a block diagram of the transmitter side AFE circuit of the DMT system of FIG. 1.

As shown in FIG. 2, the transmitter side AFE circuit 109 receives a digital symbol at its digital to analog (D/A) convertor 201, which outputs a corresponding analog waveform. The analog waveform is then filtered via filter 203. To provide for frequency diversity, spectral images on the harmonics of the carrier frequency can be manipulated by increasing or decreasing the sampling rate of the D/A convertor 221 so that the harmonic images fall under the filter range of filter 223. These images are then demodulated by demodulator 209. The demodulator 209 has a mixer 205, which multiplies the filtered signal with a clock signal from clock 207. The above arrangement advantageously permits recovery of the transmitted symbol by the receiver 101 despite noisy channel conditions due to signal reflections and electrical noise.

Figure 3:
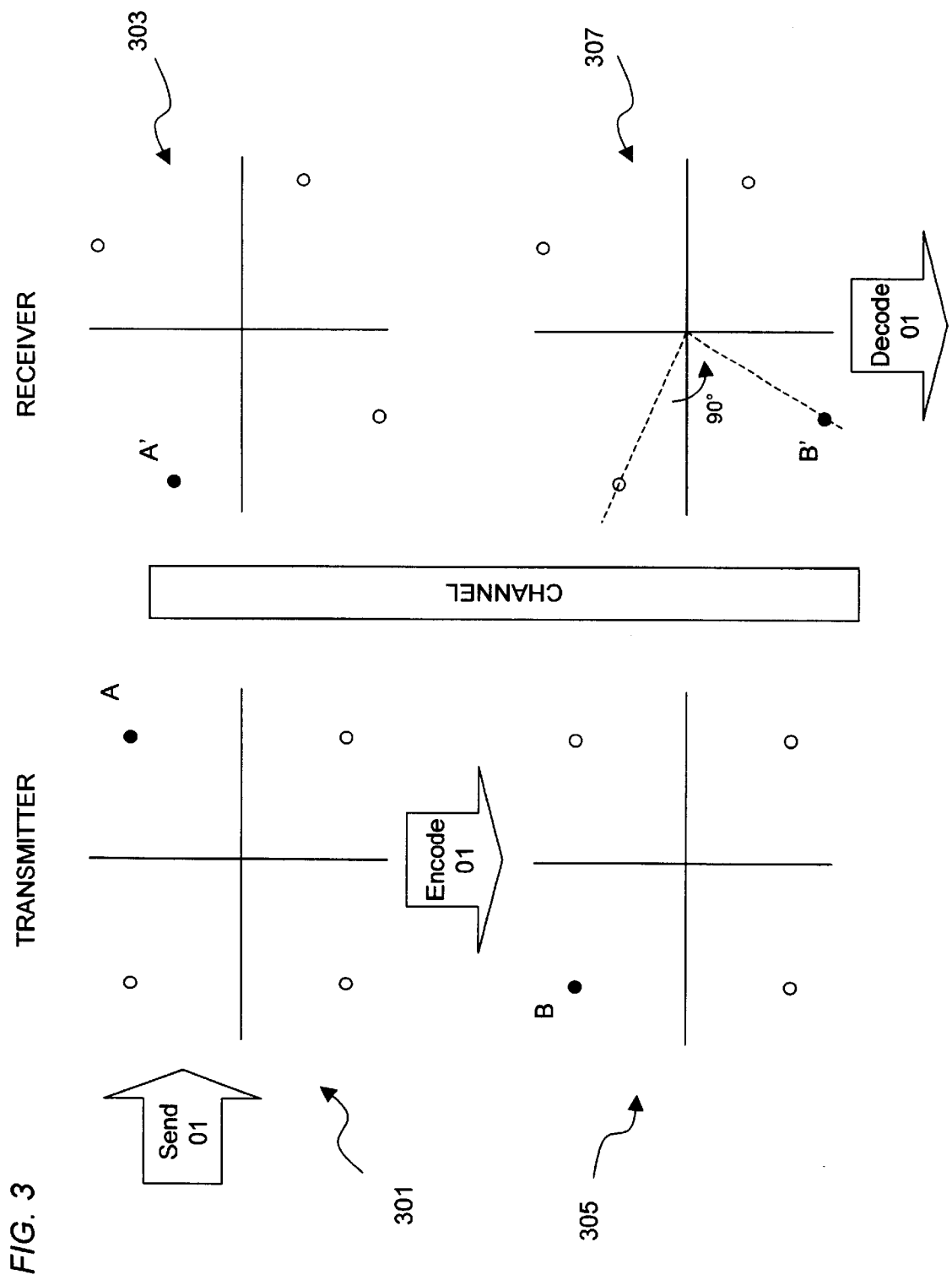
FIG. 3 is a diagram illustrating the concept of differential encoding in a DMT system in accordance with an embodiment of the present invention.

The DMT system of the present invention inherently provides tolerance to noise in part because of the use of differential encoding. FIG. 3 illustrates the general principle of this coding scheme, where the graphs 301 and 303 represent a previously sent symbol and the bottom graphs represent the current symbol that is to be transmitted over the chanrel 125. For example, assume the transmitter circuit 101 receives a bit stream in which 01 is the first bit sequence. Under this exemplary scheme, the bit sequence is 2 bits in length; however, N bits can be used in which the number of constellation points would equal $2^N$. The transmitter first sends a reference symbol, which assigns a reference point on the complex plane for each tone. In this particular example, the reference point of this tone is point A (graph 301). Because of the channel response, the reference point may be received as point A', shown in graph 303. Now, assume that the mapping of the bit sequence 01 is to point B (on graph 305), which is a 90° phase shift. That is, a 90° phase shift represents bits 01. The symbol is thus encoded accordingly. Channel characteristics remain nearly constant between symbol transmissions. As a result, the amplitude and phase relation between two constellation points should stay reasonably constant, thereby permitting the encoding of information in the relative phase position. Once across the channel, the received constellation point is point B', in which the receiver circuit 111 detects a 90° phase difference and an amplitude difference of 0. The 90° phase difference indicates to the receiver 111 that point B' should be remapped or decoded as 01. By differentially encoding a signal, information about the channel characteristics are not needed, thus minimizing the impact of channel response. This is possible, in part, because channel characteristics do not change too abruptly. Furthermore, differentially encoding the bit sequence on a consecutive symbol symbol basis, as opposed to using a fixed reference symbol, is equivalent to updating the constellation rotation, thereby reducing problems associated with transmitter and receiver clock difference.

Figure 4A:
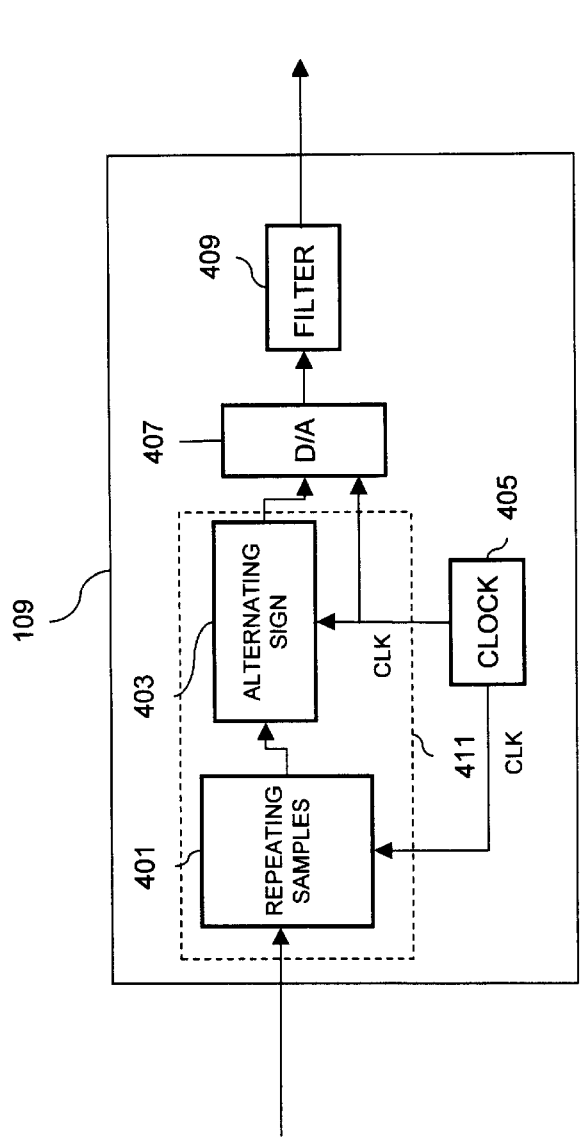
FIGS. 4a and 4b are block diagrams of the transmitter side AFE circuit utilizing a system clock to frequency shift in accordance with the embodiments of the present invention.
Figure 4B:
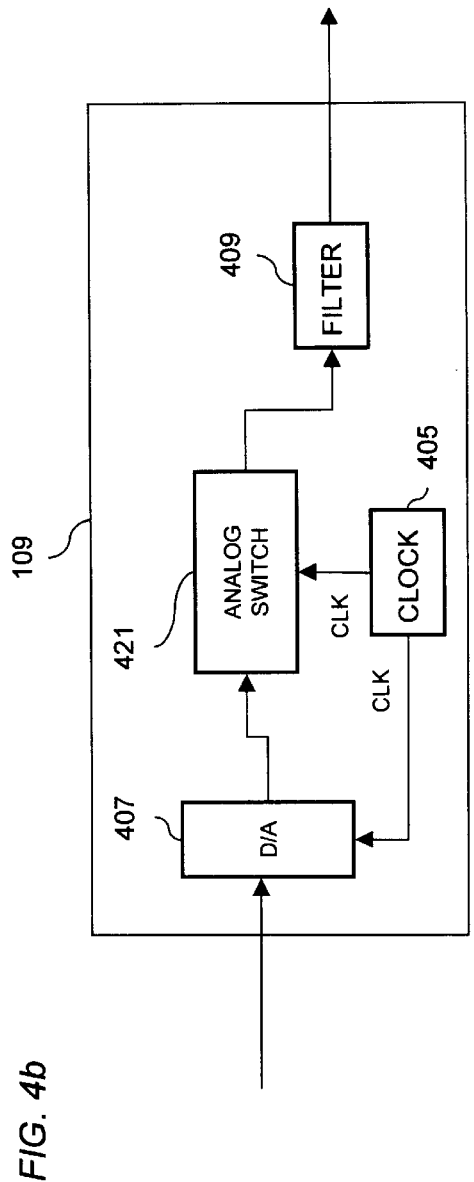

FIGS. 4a and 4b represent two alternative embodiments of the AFE circuit 109 of FIG. 2 for frequency shifting the symbol by multiplying the clock signal (CLK), which has a frequency of $f_{CLK}$, with the symbol waveform (i.e., baseband signal). The clock 423, in an exemplary embodiment, serves as the system clock for both the transmitter circuit 101 and receiver circuit (not shown) within a DMT transceiver (not shown). FIG. 4a illustrates one embodiment of AFE circuit 109, in which a digital mixer 413 up converts the baseband signal to a passband signal around $f_{CLK}$ according to the following frequency component equations:

$$Y(f)=F(f)*C(f) \quad (1)$$

$$C(f)=\Sigma \alpha_{n_n} \delta(f-nf_{CLK}) \quad (2)$$

$$Y(f)=\Sigma \alpha_{n_n} F(f-nf_{CLK}) \quad (3)$$

Per equation (1), Y(f) is the output of the convolution of the baseband signal (or modulating signal), F(f), by the clock signal C(f) running at carrier frequency $f_{CLK}$. As evident from equation (2), the frequency component of the clock signal, C(f), is an infinite series of impulses with amplitudes $\alpha_n$. The convolution of F(f) and C(f) yields equation (3), which indicates that the frequency spectrum of the baseband signals are spaced according to the clock rate, $f_{CLK}$. The implementation of equation (3) is accomplished by an embodiment of the AFE circuit 109 that employs digital mixer 413, which comprises a repeating samples block 401 and an alternating sign block 403. The repeating samples block 401, as the name suggests, duplicates or repeats the baseband signal based upon the clock rate $f_{CLK}$. Such repeating samples alternately undergo a sign change via the alternating sign block 403. For example, if the first sample has a positive amplitude, the next sample would be made negative; this assignment occurs for all samples of a digital waveform. Ultimately, the alternating sign block 403 outputs the digital waveform to a D/A converter 407. It should be noted that the repeating samples block 401, alternating sign block 403, and the D/A converter 407 all rely on the clock 405 to properly process the waveforms. The D/A converter 407 outputs an analog waveform to be filtered by bandpass filter 409. This embodiment of the AFE circuit 109 provides a simple way to multiply the clock signal with the baseband digital waveform in that the components of the digital mixer 411 do not necessitate complex logic. Another embodiment of the AFE circuit 109 that implements frequency shifting based upon the clock signal is shown in FIG. 4b.

FIG. 4b provides a technique for frequency shifting a symbol through the use of an analog switch 421 that is driven by clock 405. Like the arrangement of FIG. 4a, the principle of operation of this particular embodiment is governed by equations (1)–(3). Under the current configuration, the up conversion is accomplished via analog switch 421, which is deployed behind the D/A converter 201. That is, the digital waveform of the symbol is first converted to its analog equivalent and then processed. The operation of the analog switch 421 follows the binary values of CLK. When CLK is HIGH, the analog switch 421 is ON; correspondingly, when the clock signal is LOW, the analog switch 421 is OFF. The switching of the analog signals yields a spectrum that is the same as the previous embodiment. This spectrum is shown in FIG. 5.

Figure 5:
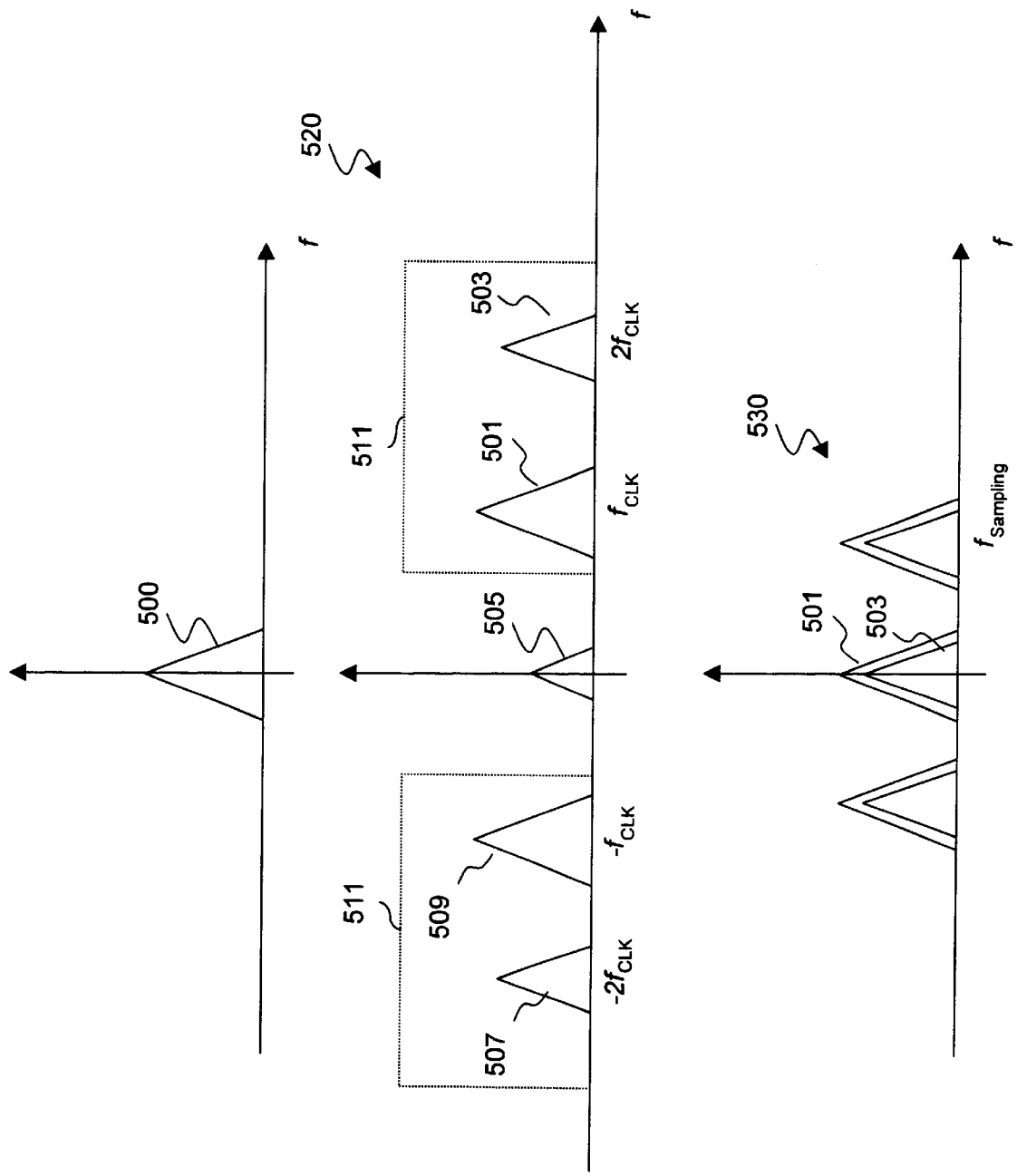
FIG. 5 is a spectrum of an exemplary symbol that has been frequency shifted in accordance with an embodiment of the present invention.
Figure 6:
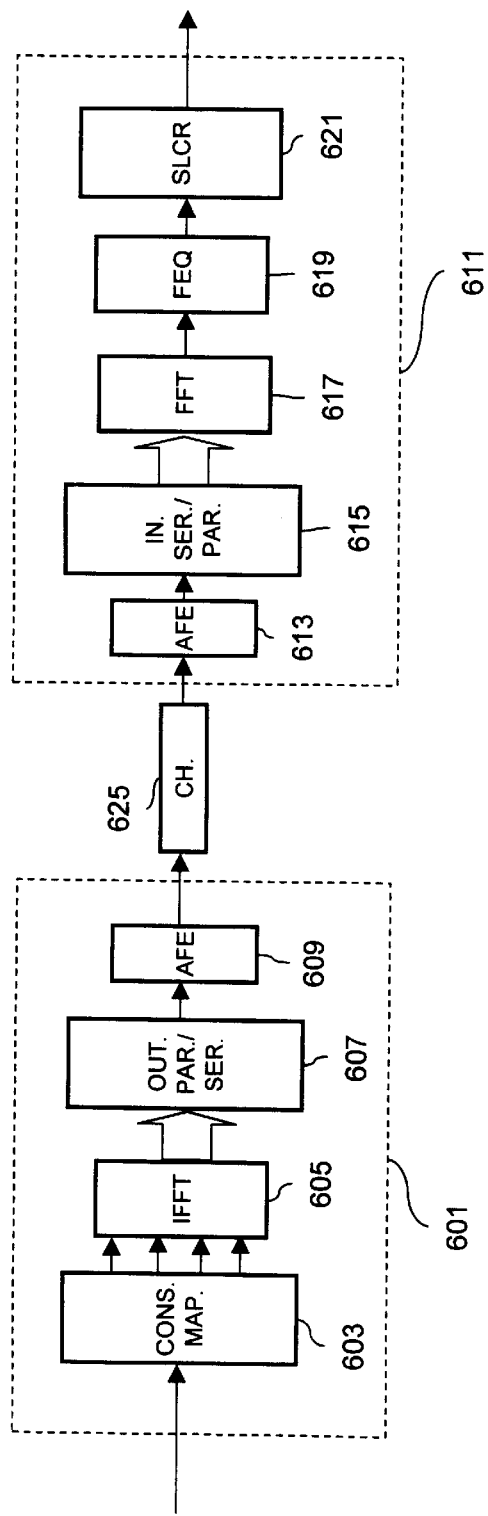
FIG. 6 is a block diagram of a conventional DMT system.
Figure 7:
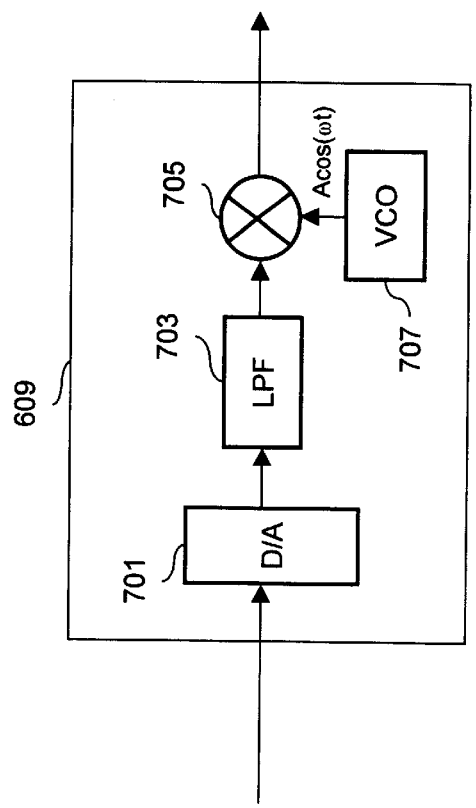
FIG. 7 is a block diagram of a conventional AFE circuit of the DMT system of FIG. 6.

FIG. 5 illustrates an exemplary spectrum of the symbol to be transmitted by the transmitter circuit 101. The baseband signal of the symbol has a spectral image 500, which is then mixed using either of the embodiments of the AFE circuit 109 discussed with respect to FIGS. 4a and 4b. After the up conversion using the clock 405, the spectrum of 520 results. The figure reveals that the spectral image 500 has been frequency repeated and shifted by the clock rate $f_{CLK}$; i.e., at $-f_{CLK}$ and $+f_{CLK}$. The envelope 511 of the bandpass filter 409 passes the images 501, 503, 507, and 509 and eliminates image 505. The filter 409 can be readily relaxed to capture more harmonics to provide frequency diversity. In other words, the bandwidth of the filter 409 can be increased as appropriate. Assuming that the channel completely distorts the images 501 and 509 at the carrier frequency (i.e., $f_{CLK}$ and $+f_{CLK}$) such that the power spectral densities of these images 501 and 509 are negligible, the encoded information is not lost. Such information is preserved in the harmonics 503 and 507. Furthermore, by proper sampling on the receiver side, the spectral images can be made to overlap as in graph 530. In this manner, more harmonic images can be captured by the filter 409 to guard against the possibility of losing the image at the carrier frequency. For example, if the spectral image 501 is eliminated, image 503 can be demodulated.

According to the disclosed embodiments, a DMT system using differential encoding employs two techniques to frequency shift using a system clock signal. One approach utilizes an AFE circuit with a digital mixer to up convert the baseband symbol to the clock rate. Another effective arrangement manipulates the symbol in analog form with an analog switch that switches ON and OFF in response to the clock signal. These techniques enable manipulation of the spectral characteristics of the transmitted symbol to that the effects of channel impairments can be minimized. Because of the elegance of these two approaches, component cost can be reduced.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A communication system for transmitting a bit stream, comprising:
   a transmitter circuit for generating a symbol comprising differentially encoded signals, each of the differentially encoded signals being mapped to one of a plurality of carrier frequencies based upon the bit stream;
   a receiver circuit for receiving the symbol and decoding the differentially encoded signals of the symbol to output the bit stream, the received differentially encoded signals each having a plurality of spectral images associated with the corresponding carrier frequency and harmonics of the corresponding carrier frequency; and a system clock coupled to the transmitter circuit, wherein the transmitter circuit includes circuitry for frequency shifting the differentially encoded signals based upon the system clock rate.

2. The communication system as in claim 1, wherein the transmitter circuit comprises:

a differential encoder for mapping the bit stream into corresponding differentially encoded frequency-domain signals, each of the differentially encoded frequency-domain signals being equated to N bits of the bit stream, wherein N is an integer;

frequency-to-time transform logic for converting in a parallel manner each of the differentially encoded frequency-domain signals to time-domain signals;

parallel-to-serial logic for converting the time-domain signals to a serial stream of differentially encoded signals; and an analog front end (AFE) circuit for selectively filtering the differentially encoded signals of the symbol to pass a prescribed number of spectral images, performing digital to analog conversion of the filtered serial stream based upon the system clock rate, and subsequently transmitting the symbol based upon the system clock rate.

3. The communication system as in claim 2, wherein the AFE circuit comprises a digital mixer for frequency shifting the differentially encoded signals in response to the system clock rate.

4. The communication system as in claim 3, wherein the system clock rate is twice the frequency of the carrier frequency.

5. The communication system as in claim 2, wherein the AFE circuit includes the circuitry for frequency shifting the differentially encoded signals based upon the system clock rate, the circuitry comprising an analog switch.

6. The communication system as in claim 1, wherein the receiver circuit comprises:

an analog front end circuit (AFE) for receiving the symbol and performing analog to digital conversion of the differentially encoded signals;

serial-to-parallel logic for converting the differentially encoded signals to a parallel array of differentially encoded signals;

time-to-frequency transform logic for converting each of the parallel differentially encoded signals to frequency-domain signals; and differential decoder logic for mapping each of the frequency-domain signals to a corresponding N bits.

7. The communication system as in claim 2, wherein N is equal to 2 and the plurality of carrier frequencies is 256.

8. The communication system as in claim 1, wherein the symbol further comprises a cyclic prefix to provide symbol separation.

9. The communication system as in claim 2, wherein the frequency-to-time transform logic executes an inverse Fast Fourier Transform.

10. The communication system as in claim 6, wherein the time-to-frequency transform logic executes a Fast Fourier Transform.

11. A method for transmitting a bit stream, comprising the steps of:

generating a symbol comprising differentially encoded signals based upon the bit stream via a plurality of carrier frequencies;

receiving the symbol and decoding the differentially encoded signals of the symbol to output the bit stream, the received encoded signals each having a plurality of spectral images associated with the corresponding carrier frequency and harmonics of the carrier frequency; and frequency shifting the differentially encoded signals based upon a clock signal.

12. The method as in claim 11, wherein the step of frequency shifting is performed by a digital mixer configured for operating in response to the clock rate of the clock signal.

13. The method as in claim 11, wherein the step of frequency shifting is performed by an analog switch configured for operating in response to the clock rate of the clock signal.

14. The method as in claim 11, wherein the step of generating further comprises:

filtering the symbol to pass a prescribed number of spectral images;

transforming the differentially encoded signals from frequency-domain signals to time-domain signals;

creating a serial stream of the time-domain signals; and performing digital to analog conversion of serial stream based upon the clock rate of the clock signal.

15. The method as in claim 14, wherein the step of transforming is performed by an inverse Fast Fourier Transform logic.

16. The method as in claim 11, wherein the step of receiving comprises:

filtering the received symbol;

performing analog to digital conversion of the received differentially encoded signals of the symbol based upon the clock rate of the clock signal;

converting the digitized differentially encoded signals from serial signals to parallel signals; and transforming the differentially encoded signals into frequency-domain signals.

17. The method as in claim 16, wherein step of transforming is performed by a Fast Fourier Transform logic.

* * * * *